July 15, 1941.  F. R. KERNS ET AL  2,249,659
BATTERY CONVEYING AND DUMPING APPARATUS
Filed Jan. 25, 1940  5 Sheets-Sheet 1

INVENTORS
FRED R. KERNS
ARTHUR O. CODNEY
BY Kwis Hudson & Kent
ATTORNEYS

July 15, 1941.   F. R. KERNS ET AL   2,249,659
BATTERY CONVEYING AND DUMPING APPARATUS
Filed Jan. 25, 1940   5 Sheets-Sheet 2

INVENTORS
FRED R. KERNS
ARTHUR O. CODNEY
BY Kwis Hudson & Kent
ATTORNEYS

July 15, 1941.  F. R. KERNS ET AL  2,249,659
BATTERY CONVEYING AND DUMPING APPARATUS
Filed Jan. 25, 1940  5 Sheets-Sheet 5

INVENTORS
FRED R. KERNS
ARTHUR O. CODNEY
Kwis Hudson & Kent
ATTORNEYS

Patented July 15, 1941

2,249,659

UNITED STATES PATENT OFFICE 2,249,659

BATTERY CONVEYING AND DUMPING APPARATUS

Fred R. Kerns and Arthur O. Codney, Cleveland Heights, Ohio, assignors to Willard Storage Battery Company, Cleveland, Ohio, a corporation of West Virginia Application January 25, 1940, Serial No. 315,566

13 Claims. (Cl. 214—1.1)

This invention relates to battery conveying and handling apparatus, and more particularly to improved apparatus for inverting or dumping storage batteries for the removal of electrolyte therefrom.

An object of this invention is to provide improved apparatus by which storage batteries to be emptied of electrolyte can be inverted and drained with a minimum amount of manual effort and by which the inverting and draining of the batteries can be carried out as a continuous operation.

Another object of our invention is to provide improved battery dumping apparatus embodying a conveyor having carriers or containers of a novel construction and arrangement into which the batteries to be emptied can be readily loaded as the carriers arrive at the loading station and from which the emptied batteries can be easily removed when they are returned by the conveyor to an adjacent unloading station.

A further object of our invention is to provide improved battery handling or dumping apparatus, of the type mentioned, embodying novel means for collecting the vent plugs which fall from the batteries during the inverting thereof; novel means for tilting or rocking the inverted batteries for facilitating the complete drainage thereof; and means for washing the carriers after drainage of the batteries to free the same from electrolyte which may have been spilled thereon.

Still another object of our invention is to provide battery conveying or dumping apparatus, of the type mentioned, having a novel arrangement of rails for supporting and guiding the conveyor and battery carriers and for controlling the movement of the carriers during the inverting of the batteries.

Our invention may be further briefly summarized as consisting in certain novel combinations and arrangements of parts hereinafter described and particularly set out in the appended claims.

In the accompanying sheets of drawings.

Figures 1, 2:
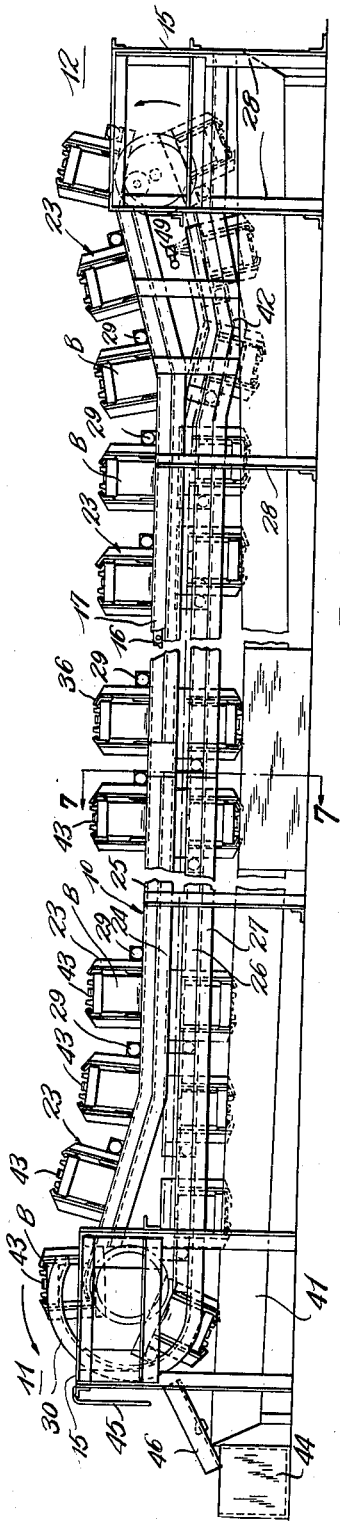
Fig. 1 is a side elevation showing battery conveying and dumping apparatus constructed according to our invention.
Fig. 2 is an end view of the apparatus as seen from the end at which the filled batteries are inverted.

More detailed reference will now be made to the battery conveying and dumping apparatus illustrated in the drawings for the purpose of describing the construction and operation thereof, and although we have shown but one embodiment, it will be understood, of course, that our invention includes various other constructions and arrangements of similar apparatus.

Figure 3:
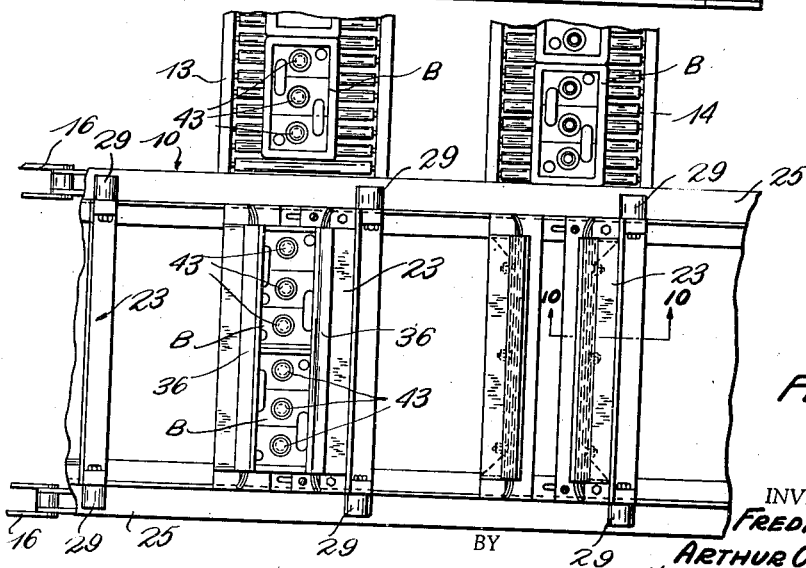
Fig. 3 is a partial plan view of the apparatus showing the loading and unloading stations.

As shown in Figs 1, 2 and 3, our battery conveying and dumping apparatus comprises an elongated conveyor 10 having a dumping end 11 at which the filled batteries B are inverted, and a return end 12 at which the emptied batteries are restored to upright position. The general arrangement of apparatus also includes loading and unloading stations located adjacent the intermediate portion of the main conveyor 10, and auxiliary conveyors or tables 13 and 14 extending substantially normal to the main conveyor at said loading and unloading stations, respectively, for supplying the filled batteries to the loading station and removing the emptied batteries from the unloading station.

Figure 4:
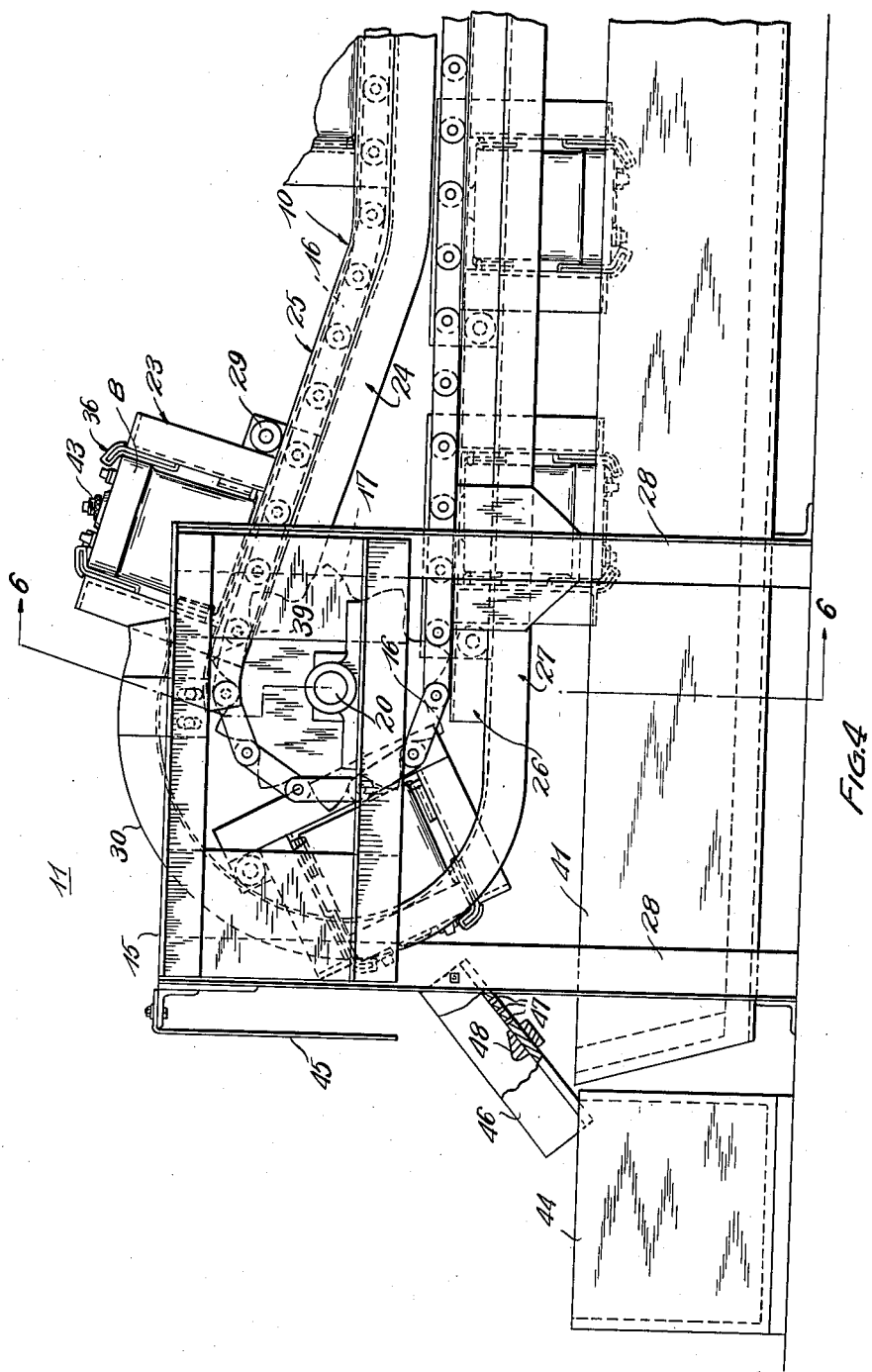
Fig. 4 is a partial side elevation showing, on a larger scale than in Fig. 1, the end of the apparatus at which the filled batteries are inverted.
Figure 5:
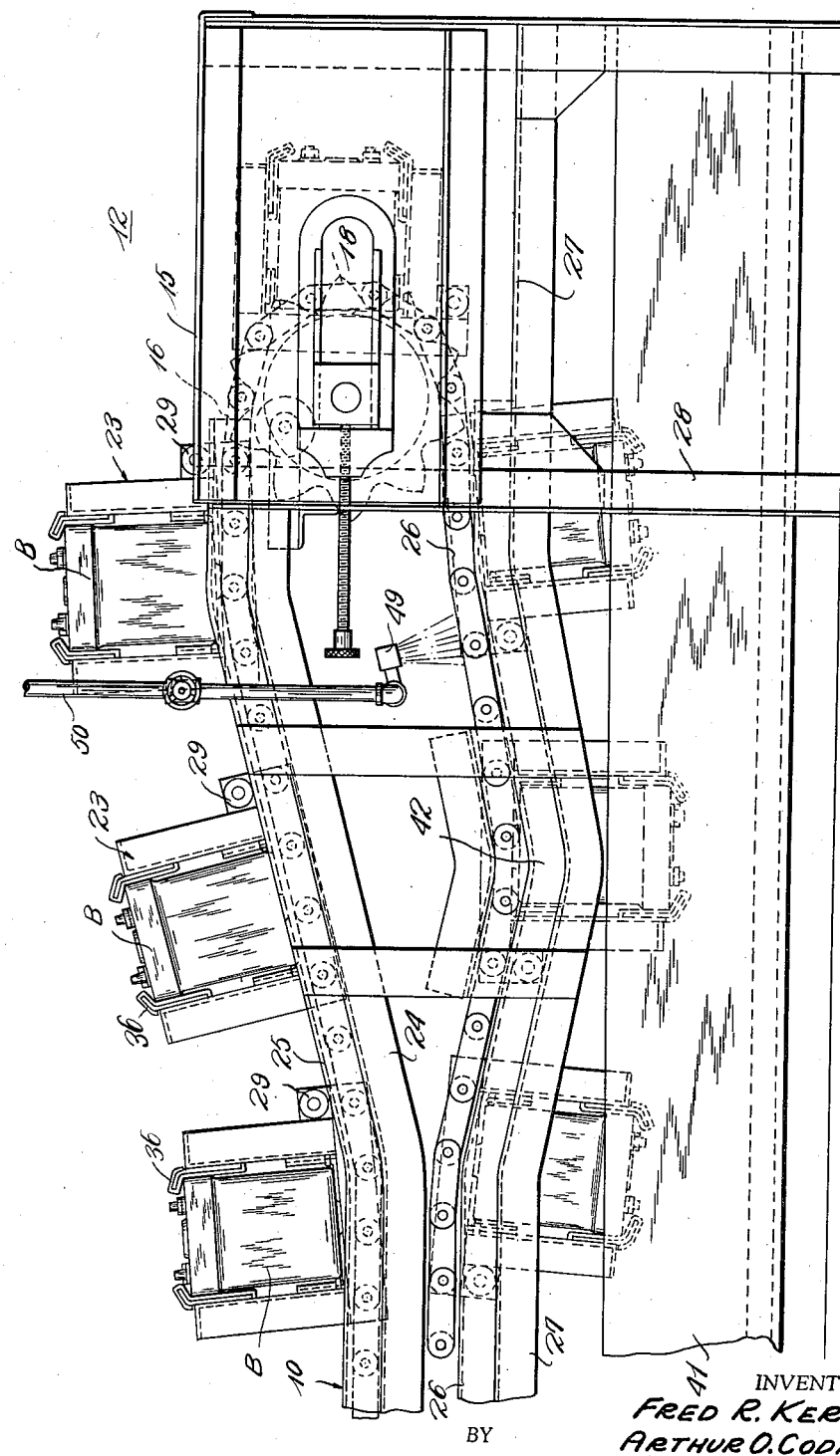
Fig. 5 is a similar side elevation showing the end of the apparatus at which the emptied batteries are restored to upright position.

The main conveyor 10 may comprise an elongated frame or support 15 of appropriate construction and endless conveyor chains 16 which travel along the support. As shown in Figs. 4 and 5, sprockets 17 and 18 are provided on the frame at the dumping and return ends 11 and 12 and the endless conveyor chains 16 travel around these sprockets. The chains may be driven by a suitable power device, such as the electric motor 19, which is connected with the shaft 20 of the sprockets 17 through gearing 21. Carriers or containers 23, of a construction to be described hereinafter and adapted for carrying the batteries B, are connected with the chains 16 at spaced points and are propelled thereby along the frame 15 past the loading station and around the sprockets 17 and 18 in succession and then back to the unloading station.

The conveyor frame 15 may be built up of structural bars, such as angle iron bars, arranged to provide an upper pair of tracks 24 and 25, and a lower pair of tracks, 26 and 27, extending longitudinally between the sprockets 17 and 18 and supported at the desired elevation above the floor by the posts or uprights 28. The track 24 of the upper pair comprises a pair of laterally spaced rails 24a and 24b which support the upper run of the conveyor chains 16 (see Fig. 7). The track 26 of the lower pair also comprises a pair of laterally spaced rails 26a and 26b which support the return portion or lower run of the conveyor chains 16. The track 25 comprises a pair of laterally spaced rails 25a and 25b and likewise, the track 27 comprises a pair of laterally spaced rails 27a and 27b. The tracks 25 and 27 support and guide the carriers 23 as the latter are propelled by the conveyor chains and are traverse by the rollers 29 of the carriers.

At the dumping end 11 of the conveyor, the tracks 24 and 25 are deflected or inclined upwardly to deliver the conveyor chains to the top of the sprockets 17, and similarly, at the return end 12 these tracks are inclined upwardly to receive the conveyor chains from the top of the sprockets 18. As shown in Figs. 1 and 4, the left end of the track 26 is disposed below the sprockets 17 so as to receive the conveyor chains therefrom, but the rails of the track 27 are extended in the form of a curved track section or dumping control cam 30 which extends around the sprockets 17 in spaced relation thereto and ends at a point above the sprockets and somewhat to the right of the vertical plane extending through the axis of the shaft 20. At the return end 12 of the conveyor the track 26 ends beneath the sprockets 18 to deliver the conveyor chains thereto and the track 27 may end at a similar point or may be extended longitudinally beneath the sprockets to the end of the conveyor frame.

Figures 8, 9, 10:
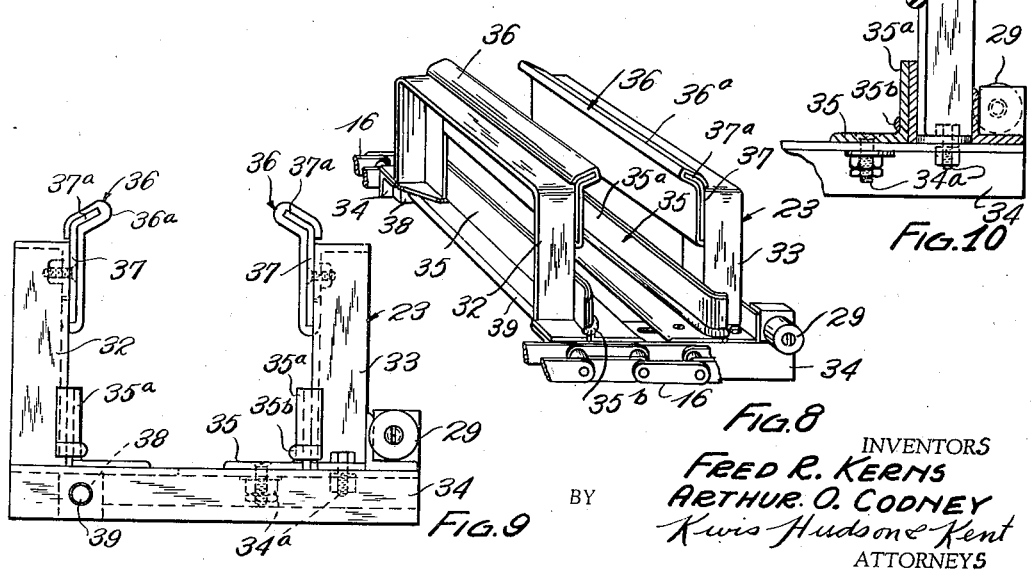
Fig. 8 is a perspective view showing one of the battery carriers and illustrating the construction thereof and the manner of connection with the conveyor chains.
Fig. 9 is an end elevation of one of the battery carriers.
Fig. 10 is a partial transverse sectional view taken through a side of a battery carrier to further illustrate the construction.

The battery carriers 23 may be of a basket-like or frame-like construction comprising elongated containers which, as shown in the drawings, are open at their ends and extend transversely of the conveyor 10 so that the batteries B can be loaded into or removed from the carriers by sliding the same through one of these open ends. As shown in Fig. 8 of the drawings, each carrier or container 23 comprises a pair of spaced upright sides 32 and 33 which are retained in the desired relation by being connected with a pair of longitudinally extending laterally spaced bottom members 34. Each of the sides 32 and 33 includes an angle iron 35 and when the sides are connected with the bottom members 34, these angle irons form a pair of supports or guide rails onto which the batteries B can be slid as they are loaded into the carriers and on which the batteries rest while the carriers are being propelled along the frame 15 in their upright position. The upright flange or leg 35a of the angle irons 35 may have a bearing strip 35b thereon for contact with the sides of the batteries and the outer ends of the legs 35a may be curved away from each other, as shown in Figs. 8 and 9, to facilitate the insertion of the batteries into the carriers.

Each side 32 and 33 also includes a retaining member 36 at the top thereof and these members serve the purpose of supporting the batteries and retaining the same in the carriers while the batteries travel along the frame 15 in their inverted position. The retaining members 36 may each comprise an elongated metal plate 37 having an inturned flange 37a along its upper edge. Except for the flanges 37a the tops of the carriers are open and these flanges are made only wide enough to engage and support the edges of the batteries when the latter are inverted, thus leaving the tops of the batteries exposed so that the electrolyte or acid can drain freely therefrom between the retaining members. To prevent marring of the batteries and to protect the retaining members 36 from the electrolyte, we may provide these retaining members with a covering 36a of rubber or other appropriate cushioning and protective material.

As mentioned above, the carriers 23 are connected with the conveyor chains 16 so as to be propelled thereby along the frame 15. This connection preferably is a pivotal connection located at or adjacent the leading edge or side of the carrier, that is the left-hand side of the carrier as seen in Fig. 8. For the purpose of this pivotal connection, we provide the bottom members 34 of the carrier with suitable bearings 38 and arrange a pivot shaft 39 to extend transversely of the conveyor through these bearings and into the two laterally spaced chains 16. The leading edge of the carrier 23 is thus pivotally supported on the chains 16 which, in turn, rest upon the tracks 24 and 26. For supporting the other or trailing edges of the carriers 23, we provide each carrier with a pair of the above-mentioned rollers 29 which are suitably connected with the bottom members 34, preferably at an elevation above that of the pivot shaft 39 so that the rollers can travel on the tracks 25 and 27.

Figure 7:
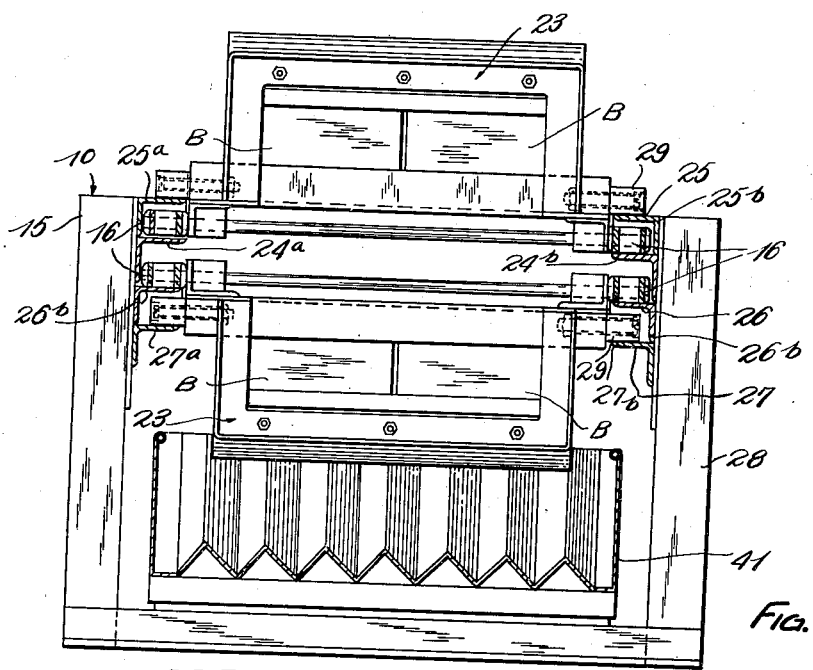
Fig. 7 is a transverse sectional view taken through the apparatus at an intermediate point thereof, as indicated by line 7—7 of Fig. 1.
Figure 6:
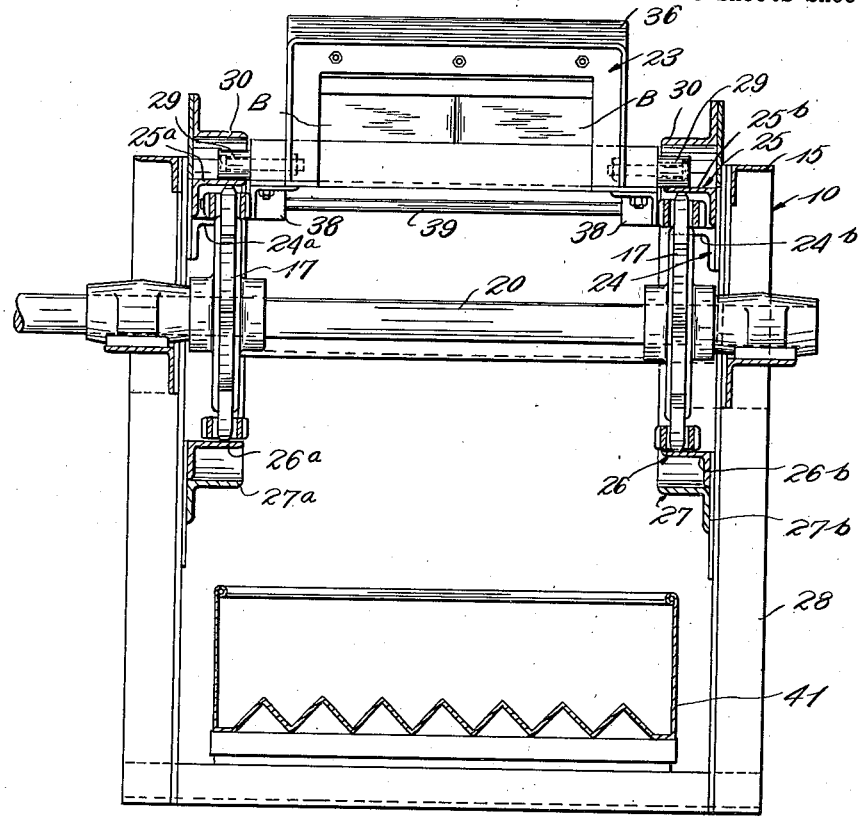
Fig. 6 is a transverse sectional view taken through the apparatus at the dumping end, as indicated by line 6—6 of Fig. 4.

The carriers 23 may be of a length, nearly as wide as the lateral spacing of the chains 16, and preferably are of a length to accommodate two storage batteries B end-to-end, as shown in Figs. 6 and 7. To enable the carriers to accommodate batteries of different widths, we may provide an adjustable connection between the side 33 and the bottom members 34 whereby this side can be adjusted toward or away from the side 32 and can be clamped in the desired position of adjustment by the bolts 34a. It will be understood, of course, that some variation in storage battery width can be accommodated or tolerated merely by reason of the inwardly extending flanges 37a of the retaining members 36.

In the operation of the apparatus, the conveyor chains 16 are driven so as to propel the carriers 23 past the unloading and loading stations in succession and toward the sprockets 17. When the carriers arrive at the loading station, the batteries B are taken from the supply conveyor 13 and are loaded into the carriers in succession through the open ends thereof. As the carriers approach the dumping end 11, they travel up the inclined portions of the tracks 24 and 25 and the chains 16 pass onto the sprockets 17. Since the leading edge of each carrier is hinged to the conveyor chain by the pivot shaft 39, this edge of the carrier is constrained to travel around on the sprockets 17 while the other edge can stand out or swing away from the sprockets. When each carrier arrives at a position approximately on top of the sprockets 17, its pair of rollers 29 leave the track 25 and engage under the curved track section or dumping cam 30, as will be seen from Fig. 4. As the carriers travel around the sprockets they are progressively tipped until they arrive at an inverted position at the bottom of the sprockets. During this tipping the rollers 29 bear against the curved track section or dumping cam 30 and the carriers are thus supported and guided during the tipping and are prevented from swinging suddenly outward away from the sprockets.

When the batteries are tipped by the inversion of the carriers 23 as just explained, the electrolyte flows out of the filling openings of the batteries, from which the vent plugs have been previously unscrewed, and continues to drain from the batteries during their inverted travel along the lower pair of tracks 26 and 27 from the sprockets 17 toward the sprockets 18. The above-described open-top construction of the carriers 23 exposes the tops of the batteries and readily permits the free drainage of electrolyte from the filling openings thereof. For collecting the electrolyte which drains from the batteries, we provide an elongated lead-lined tank or trough 41 which extends longitudinally beneath the conveyor 10. This tank is preferably arranged to extend for the full length of the apparatus and is located relative to the chain-supporting track 26 such that when the carriers 23 are inverted the tops of the batteries will extend part way into the tank, as shown in Fig. 4, whereby the tendency for electrolyte to be splashed or deflected out of the tank will be reduced to a minimum.

It will be understood, of course, that the length of the conveying apparatus and the speed at which the conveyor chains 16 are driven, will be such that substantially complete drainage of electrolyte from the batteries will be obtained during their inverted travel from the sprockets 17 to the sprockets 18. To facilitate the complete drainage of the batteries, we may provide a dip 42 at an appropriate point in the tracks 26 and 27 for causing rocking or tilting of the batteries. Although this dip or several such dips can be located at any appropriate point or points in the tracks 26 and 27, we prefer to locate the dip, or at least one of them, adjacent the sprockets 18 so that the batteries will be rocked after the main body of electrolyte has had an opportunity to flow freely from the batteries. With this location for the dip it will thus be seen that electrolyte remaining in the batteries will be more readily dislodged so that it can drain from the batteries during the remainder of their inverted travel toward the sprockets 18.

At an appropriate point during the travel of the storage batteries, preferably just after they have been loaded into the carriers 23, the vent plugs 43 are removed from the filling openings of the battery cells and are laid on top of the batteries. When the batteries arrive at the dumping end 11 and travel around the sprockets 17, these loosened plugs will fall from the batteries whereupon they can be collected in a suitable receptacle, such as the lead-lined container 44. For controlling the discharge of the plugs 43 from the batteries and directing the same to the container 44, we may provide the apron 45 and the inclined chute 46, shown in Figs. 1 and 4. The chute 46 extends outwardly and downwardly to the container 44 and the apron 45 is located in a more or less vertical position above the chute. The apron prevents the plugs from being thrown away from the conveyor and deflects the same downwardly into the chute 46.

During the tipping of the batteries, some of the electrolyte may be spilled into the chute 46 and to prevent this electrolyte from being delivered into the container 44 with the vent plugs, we may provide the upper portion of the chute with openings or perforations 47 which permit the electrolyte to drain through the chute into the tank 41 therebelow. A stop or dam 48 in the form of a bevelled bar may be arranged to extend across the bottom of the chute just below the openings 47. This stop dams the flow of electrolyte in the chute and causes the same to pass through the openings 47 but does not interfere materially with the travel of the plugs down the chute into the container 44.

It may be desirable to subject the carriers and batteries to a washing or spraying operation after the drainage of electrolyte has been substantially completed and before the carriers arrive at the sprockets 18. For this purpose we may provide a spray pipe or sprinkler 49 extending transversely of the conveyor above the track 26 and just in advance of the sprockets 18. Water or other appropriate washing fluid may be supplied to the spray pipe 49 by the pipe 50.

As the carriers 23 are propelled around the sprockets 18 by the conveyor chains 16, they restore the batteries to their upright position, as shown in Figs. 1 and 5. From the sprockets 18, the carriers travel down the inclined portions of the tracks 24 and 25 and past the unloading station and discharge conveyor 14. When the carriers arrive at the unloading station, an operator removes the emptied batteries from the carriers and places them on the discharge conveyor 14.

From the foregoing description and the accompanying drawings, it will now be readily understood that we have provided improved battery conveying and dumping apparatus by which storage batteries can be handled and emptied in a rapid and efficient manner with minimum manual effort. It will also be seen that the novel construction for the battery carriers and their arrangement on the conveyor chains facilitates the loading and unloading of the batteries by permitting lateral movement of the batteries through the open ends of the carriers. Furthermore, it will be seen that the novel arrangement of the tracks and the pivotal connection of the carriers with the conveyor chains makes possible the successful and efficient tipping of the batteries by propelling the carriers around the tipping sprockets. Additionally it will also be seen that we have provided novel means for collecting the plugs which have been loosened from the filling openings of the batteries and have also provided means for rocking the batteries to facilitate the complete drainage of electrolyte therefrom.

While we have illustrated and described the apparatus of our invention in a more or less detailed manner, it will be understood, of course, that we do not wish to be limited to the details of construction and the particular embodiment of the apparatus herein disclosed, but regard our invention as including such changes and modifications as do not constitute a departure from the spirit of the invention and the scope of the appended claims.

Having thus described our invention we claim:

1. In storage battery conveying and dumping apparatus, an elongated support having a pair of longitudinally extending laterally spaced rails, conveyor chains movable along and supported by said rails, a battery carrier comprising a container adapted to receive a battery therein and to retain the battery therein when the container is inverted, means adjacent one edge of the container for pivotally connecting the same with the chains for propulsion thereby and permitting relative separation between the chains and opposite edge of the container, means including a second pair of laterally spaced rails cooperating with said opposite edge of the container for supporting and guiding the same, and sprockets on said support around which said container is propelled by said chains for inverting the battery.

2. In storage battery conveying and dumping apparatus, an elongated support having a pair of longitudinally extending laterally spaced rails, conveyor chains movable along said rails, a battery carrier comprising a container adapted to receive a battery therein and to retain the battery therein when the container is inverted, pivot means connecting the leading edge of said container with the chains to be propelled thereby and disposed with the pivot axis extending laterally crosswise of the chains to permit relative separation between the chains and trailing edge of the container, load-carrying rollers on said container adjacent its trailing edge, a second pair of laterally spaced rails adapted to be engaged by said rollers for supporting and guiding the trailing edge of the container, and sprockets on said support around which said container is propelled by said chains for inverting the battery.

3. In storage battery dumping apparatus, a traveling conveyor having spaced battery carriers thereon each comprising a container extending laterally crosswise of the conveyor and having spaced upright sides and being open at the ends thereof for the insertion or removal of the batteries, said sides having inwardly projecting means adjacent the tops thereof for retaining the batteries in the containers when the latter are inverted.

4. In storage battery dumping apparatus, an elongated support having sprockets thereon, conveyor chains adapted to travel along said support and around said sprockets, spaced containers adapted to receive batteries to be emptied and to be moved by the chains around said sprockets for inverting the batteries, means for retaining the batteries in the containers with their tops exposed while the containers are inverted, and means arranged for supporting and guiding engagement with the containers during travel thereof around the sprockets.

5. In storage battery dumping apparatus, an elongated support having sprockets thereon, conveyor chains adapted to travel along said support and around said sprockets, spaced containers adapted to receive batteries to be emptied and to be moved by the chains around said sprockets for inverting the batteries, means for retaining the batteries in the containers with their tops exposed while the containers are inverted, and a curved dumping control cam arranged adjacent the sprockets for supporting and guiding engagement with the containers during their travel around the sprockets.

6. In storage battery dumping apparatus, an elongated support having sprockets thereon, conveyor chains adapted to travel along said support and around said sprockets, spaced containers adapted to receive batteries to be emptied and to be moved by the chains around said sprockets for inverting the batteries, a curved track adjacent the sprockets for guiding and supporting engagement with the containers during travel thereof around the sprockets, means for retaining the batteries in the containers with their tops exposed while the containers are inverted, and means pivotally connecting the containers with the chains for propulsion thereby and to permit said engagement of the containers with said curved track.

7. In storage battery dumping apparatus, an elongated support having sprockets thereon, conveyor chains adapted to travel along said support and around said sprockets, spaced containers adapted to receive batteries to be emptied and to be moved by the chains around said sprockets for inverting the batteries, means adjacent one edge of each container pivotally connecting the same with the chains and permitting swinging of the containers relative to the chains during their travel around the sprockets, means for retaining the batteries in the containers with their tops exposed while the containers are inverted, and means arranged adjacent the sprockets for supporting and guiding engagement with the containers adjacent their opposite edges during travel thereof around the sprockets.

8. In storage battery dumping apparatus, a support having sprockets and upper and lower tracks on one side of the sprockets, conveyor chains adapted to travel along said tracks and around said sprockets, a curved track on the opposite side of said sprockets, battery carriers connected with said chains at spaced points and adapted to be moved thereby along said upper and lower tracks and inverted during their travel around said sprockets, each of said carriers comprising a container extending crosswise of the conveyor chains and open at one end thereof for insertion or removal of batteries and open at the top thereof for free drainage of the batteries when inverted, means on the containers for retaining the batteries therein while the containers are inverted, and rollers on the containers adapted to engage and follow said curved track.

9. In storage battery dumping apparatus, a support having sprockets thereon, conveyor chains adapted to receive storage batteries of the type having removable closure plugs and arranged to be propelled around the sprocket for tipping and inverting the batteries, a container for collecting said closure plugs, and a chute arranged to receive closure plugs from the batteries during the tipping thereof and to direct said plugs into said container.

10. In storage battery dumping apparatus, an elongated support having sprockets thereon, conveyor chains adapted to receive storage batteries of the type having removable closure plugs and arranged to be propelled along the support and around the sprockets for tipping and inverting the batteries, a container for collecting said closure plugs, a chute arranged to receive the plugs from the batteries during the tipping thereof and to direct said plugs into said container, and an elongated tank extending under said support and under a portion of said chute to receive liquid discharged from the inverted batteries, said portion of the chute overlying said tank having openings therethrough.

11. In storage battery dumping apparatus, an elongated support having two pairs of longitudinally extending rails, conveyor chains movable along one pair of said rails, carriers pivotally connected with the chains to be propelled thereby for moving inverted batteries along said support, the other pair of rails having portions inclined relative to said one pair of rails, and means on the carriers adapted to travel along said relatively inclined portions to cause rocking of the batteries.

12. A conveyor of the character described comprising an elongated support having sprockets thereon and two pairs of laterally spaced rails extending longitudinally of the support on one side of the sprockets with the rails of one pair adjacent the corresponding rails of the other pair, a pair of conveyor chains supported by and movable along one pair of said rails and around said sprockets, article carriers spaced along the chains to be propelled thereby along said rails and around said sprockets for inverting the carriers, each carrier being pivotally connected with the chains and having rollers arranged to run on the other pair of rails simultaneously with movement of the chain portions, with which such carrier is connected, along said one pair of rails, and a pair of laterally spaced curved rails on the opposite side of said sprockets adapted to be engaged by the rollers of said carriers during inverting movement of the latter around said sprockets.

13. A conveyor of the character described comprising an elongated support having sprockets thereon and two pairs of laterally spaced rails extending longitudinally of the support on one side of the sprockets with the rails of one pair adjacent the corresponding rails of the other pair, a pair of conveyor chains supported by and movable along one pair of said rails and around said sprockets, article carriers spaced along the chains to be propelled thereby along said rails and around said sprockets for inverting the carriers, each carrier being pivotally connected with the chains and having rollers arranged to run on the other pair of rails simultaneously with movement of the chain portions, with which such carrier is connected, along said one pair of rails, a pair of laterally spaced curved rails on the opposite side of said sprockets adapted to be engaged by the rollers of said carriers during inverting movement of the latter around said sprockets, and two other pairs of laterally spaced rails extending longitudinally of the support below the first mentioned pairs of rails for supporting said chains and said rollers, respectively, after travel of the chains and carriers around said sprockets.

FRED R. KERNS.
ARTHUR O. CODNEY.